(12) United States Patent
Rang et al.

(10) Patent No.: US 8,783,124 B2
(45) Date of Patent: Jul. 22, 2014

(54) HYDRAULIC SHIFTER ON SPLIT SHAFT PTO FOR AUTOMATIC TRANSMISSION

(75) Inventors: Brian Rang, Olive Branch, MS (US); James Bohn, Olive Branch, MS (US); Nathan Knestrick, Toledo, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 234 days.

(21) Appl. No.: 13/270,497

(22) Filed: Oct. 11, 2011

(65) Prior Publication Data

US 2013/0087000 A1 Apr. 11, 2013

(51) Int. Cl.
*F16H 37/00* (2006.01)
*F16H 37/16* (2006.01)

(52) U.S. Cl.
USPC .............................. 74/15.88; 74/11; 74/15.8

(58) Field of Classification Search
USPC ............ 74/11, 15.4, 15.6, 15.66, 15.8–15.88, 74/321, 325, 329, 335, 346, 364, 372, 74/606 R, 664, 665 F, 665 R, 718, 720, 74/473.1, 473.11, 473.19, 473.36, 473.37; 180/53.6–53.8
See application file for complete search history.

(56) References Cited

U.S. PATENT DOCUMENTS

| | | | | |
|---|---|---|---|---|
| 2,242,542 A * | 5/1941 | Burkhalter et al. | ............. | 74/346 |
| 3,049,929 A * | 8/1962 | Wagner | ......................... | 74/15.2 |
| 3,053,044 A * | 9/1962 | Gresty | ............................ | 60/486 |
| 3,540,297 A * | 11/1970 | Wagner et al. | ............... | 74/15.86 |
| 4,083,382 A * | 4/1978 | Khatti et al. | ............. | 137/596.12 |
| 4,275,607 A * | 6/1981 | Snoy | ............................ | 74/15.63 |
| 4,406,356 A * | 9/1983 | Prince | .......................... | 192/3.57 |
| 4,546,661 A * | 10/1985 | Weis et al. | ..................... | 74/15.4 |
| 4,637,269 A * | 1/1987 | Hasegawa et al. | ............. | 74/335 |
| 6,151,975 A * | 11/2000 | Kirkpatrick et al. | ............. | 74/11 |

* cited by examiner

*Primary Examiner* — Troy Chambers
*Assistant Examiner* — Jake Cook
(74) *Attorney, Agent, or Firm* — Robert J. Clark

(57) ABSTRACT

A hydraulic system is provided for a hydraulic shifter assembly of a split shaft assembly having a power take off system and utilized on a vehicle that has an automatic transmission and limited access to the transmission—preventing a direct connection of a power take off to the transmission. The hydraulic system provides hydraulic pressure from the transmission to the hydraulic shifter assembly and back to the transmission from the hydraulic shifter assembly. The system also provides hydraulic pressure from the transmission to the power take off.

19 Claims, 5 Drawing Sheets

HYDRAULIC SHIFTER ON SPLIT SHAFT PTO FOR AUTOMATIC TRANSMISSION

TECHNICAL FIELD

The present invention relates to a hydraulic shifter and hydraulic system for use with a power take off and split shaft on an automatic transmission vehicle.

BACKGROUND

In order to utilize the engine of a truck to provide power for load handling equipment it is necessary to fit a power take-off unit, often referred to as a PTO. Power from this unit can be transferred either mechanically via a propeller shaft or belts, or hydraulically by fitting a hydraulic pump to the power take-off. These PTOs include shifters to operate the PTOs which are actuated by air, hydraulic fluid, or mechanical cables.

In some newer vehicles, there is no room for direct attachment of the PTO as other components are positioned where the PTO would be mounted. On one vehicle, the 4WD transfer case interferes with the positioning of the PTO on the transmission. In such cases, a split shaft can be attached to an output of the transmission and a PTO attached to the split shaft. The split shaft is typically engaged and disengaged using pressurized air. However, in vehicles having automatic transmissions, a source of air is typically not available. These air shift split shaft systems then require an add-on, small compressor and tank to supply the system.

The automatic transmission does have a readily available source of pressurized hydraulic fluid. However, the shifter assembly of the split shaft has never operated hydraulically. In addition, the pistons in the power take off units have a bleed hole in the piston of the shifter that helps speed up the release of the clutch. This results in the dumping of hydraulic fluid into the PTO which if the PTO is attached to the transmission, is not a problem. If the PTO is attached to a split shaft, then the hydraulic fluid dumps into the split shaft which is not fluidly connected to the transmission. Eventually the transmission would be starved of fluid and the split shaft would fill and overflow. In order to use the prior art power take off hydraulic shift system, there needs to be a way to get the fluid from the split shift back to the transmission. Attaching a gravity feed from the split shaft to the transmission would not overcome the problem as the flow back to the transmission would be too slow.

SUMMARY

At least one embodiment of the invention provides a hydraulic system for engaging and disengaging a power take off and a transmission, the system comprising: an automatic transmission; a split shaft rotationally coupled to an output shaft of the transmission; a power take off attached to the split shaft; a hydraulic shifter attached to the split shaft, the shifter comprising a housing and a shift shaft moveably positioned in the housing, the shaft having a piston on either end of the shaft separating the shaft from a pressure chamber on at either end of the housing; a plurality of fluid connectors and fluid valves that fluidly connect pressurized hydraulic fluid from the transmission to each pressure chamber of the shifter, the power take off, and return the fluid to the transmission.

At least one embodiment of the invention provides a hydraulic fluid system for a vehicle having an automatic transmission and a split shaft connected to an output shaft of the transmission and a power take off attached to the split shaft, the hydraulic fluid system comprising: a pressure reducing valve fluidly connected to a source of pressurized hydraulic fluid of the transmission; a first valve fluidly connecting the fluid from the pressure reducing valve to either a first pressure chamber of a hydraulic shifter or a return to the transmission; and a second valve fluidly connecting the fluid from the pressure reducing valve to either a second pressure chamber of a hydraulic shifter or the return to the transmission.

At least one embodiment of the invention provides a power take off system for a vehicle having an automatic transmission; the power take off system comprising: a split shaft connected to an output shaft of the transmission; a power take off attached to the split shaft; a hydraulic shifter comprising a shifter housing attached to the split shaft, the hydraulic shifter including a shift shaft moveably positioned in the shifter housing, the shaft having a first piston on a first end of the shaft separating the shaft from a first pressure chamber on a first end of the housing, the shaft having a second piston on a second end of the shaft separating the shaft from a second pressure chamber on a second end of the housing; a pressure reducing valve fluidly connected to a source of hydraulic fluid of the transmission; a first valve fluidly connecting the fluid from the pressure reducing valve to either the first pressure chamber of a hydraulic shifter or a return to the transmission; and a second valve fluidly connecting the fluid from the pressure reducing valve to either the second pressure chamber of a hydraulic shifter or the return to the transmission; wherein the shift shaft moves to a first position toward the second end of the shifter housing when the first valve connects the fluid from the pressure reducing valve to the first pressure chamber, and wherein the shift shaft moves to a second position toward the first end of the shifter housing when the second valve connects the fluid from the pressure reducing valve to the second pressure chamber.

BRIEF DESCRIPTION OF THE DRAWINGS

Embodiments of this invention will now be described in further detail with reference to the accompanying drawings, in which.

DETAILED DESCRIPTION OF THE DRAWING

Figure 1:
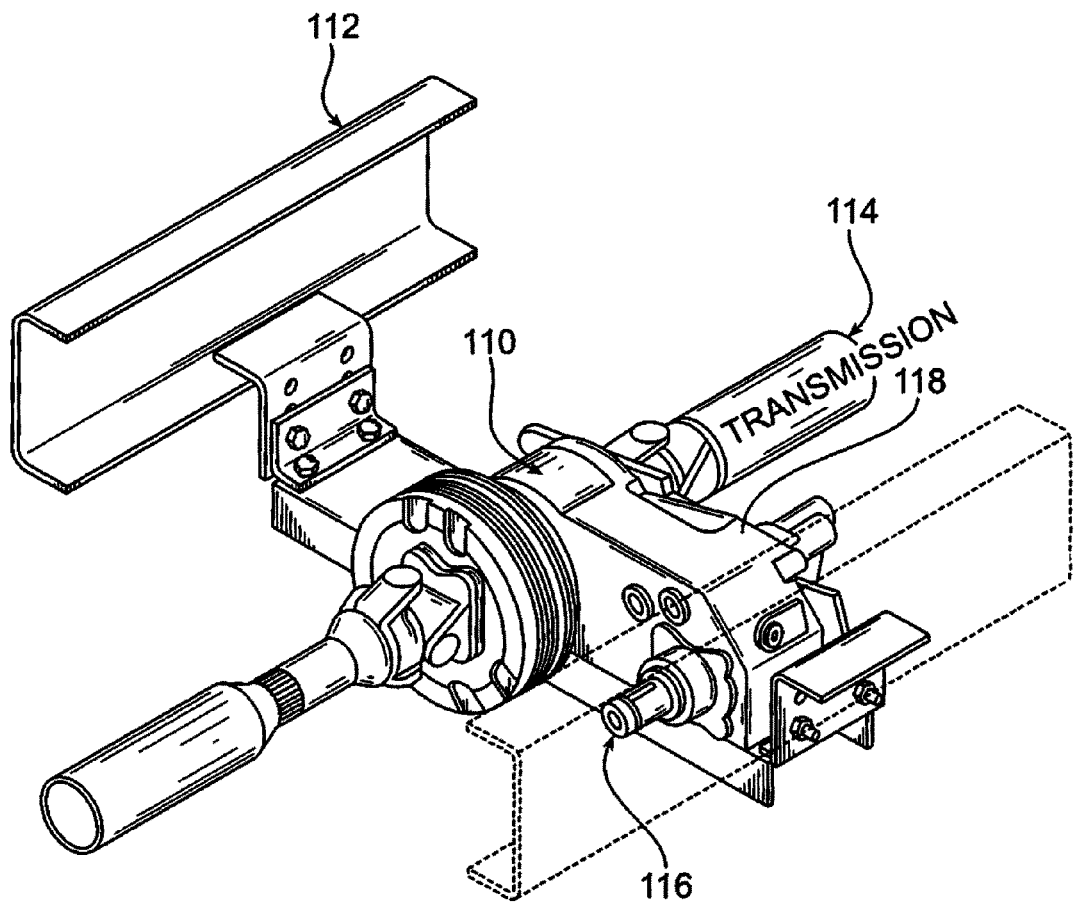
FIG. 1 is a perspective view of a prior art split shaft mounted on a portion of a vehicle.
Figure 2:
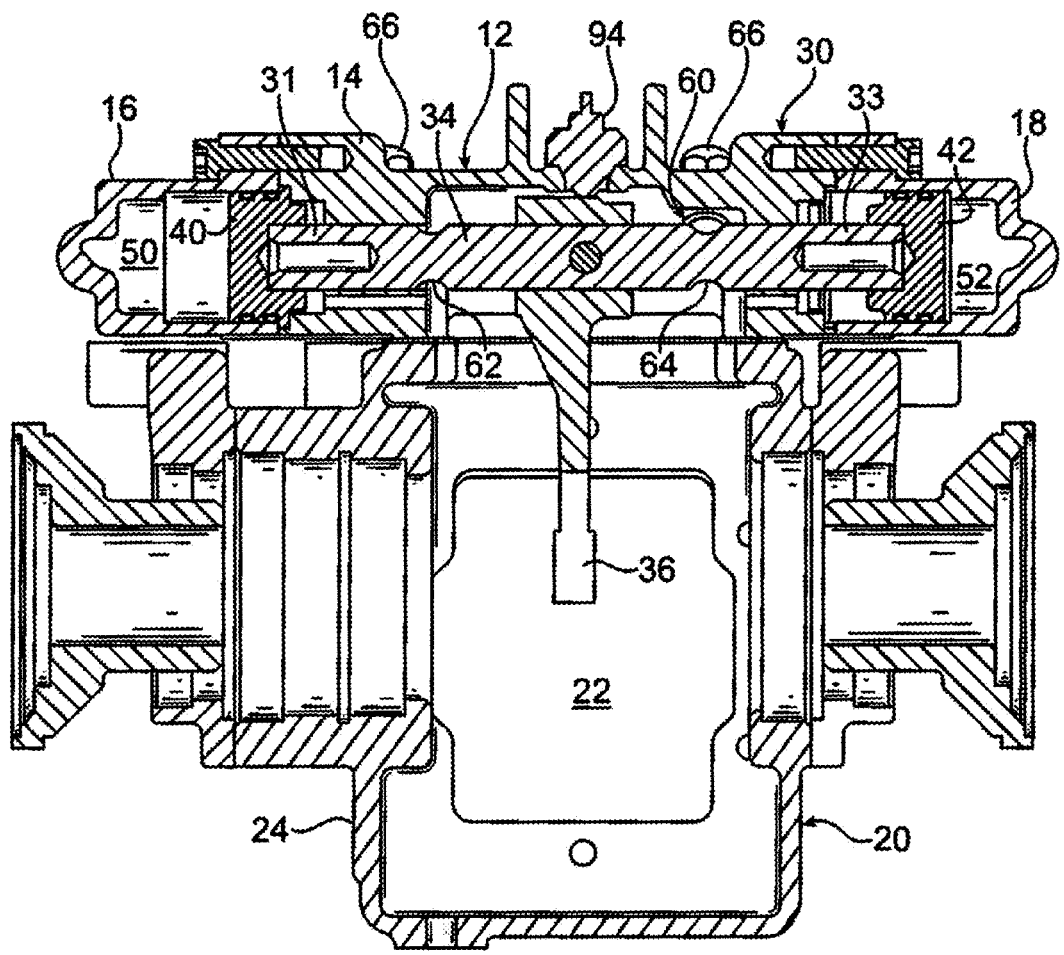
FIG. 2 is a cross-sectional view of a portion of the split shaft and the hydraulic shifter shown in a first position in accordance with an embodiment of the invention.
Figure 3:
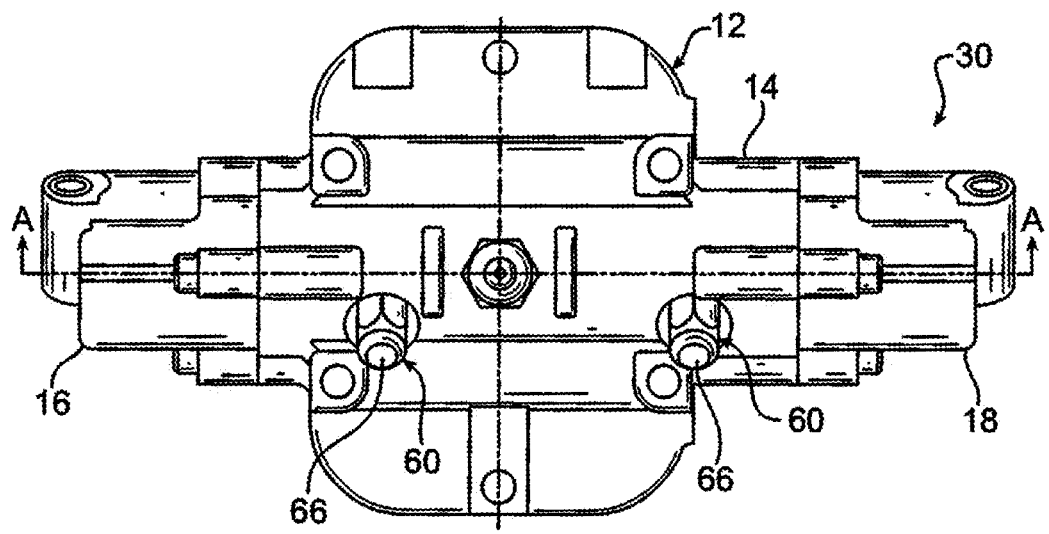
FIG. 3 is a top view of the hydraulic shifter shown in FIG. 2.
Figure 4:
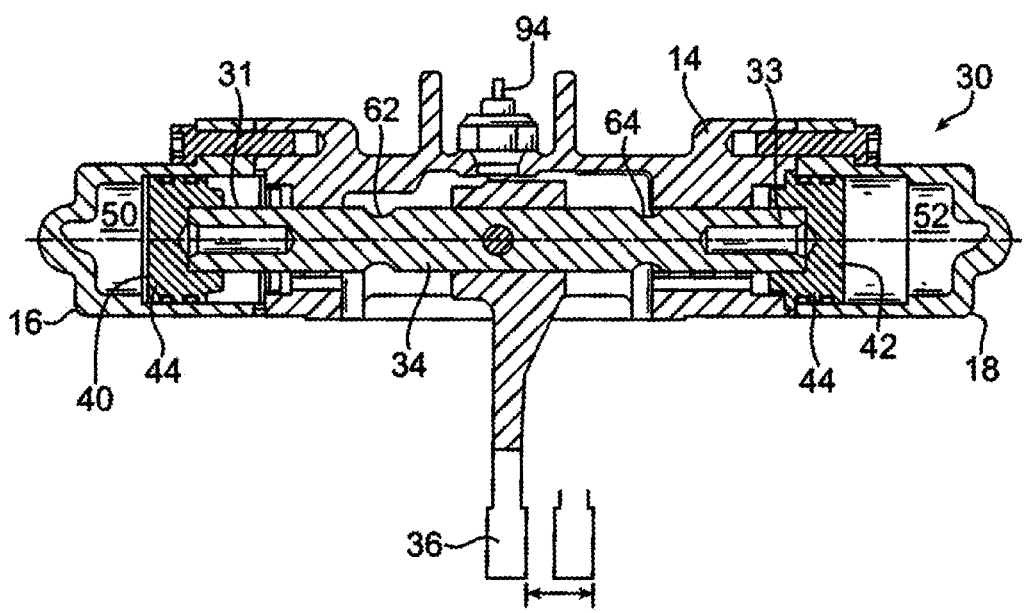
FIG. 4 is a cross-sectional view of the hydraulic shifter shown in FIG. 2 now shown in a second position.
Figure 5:
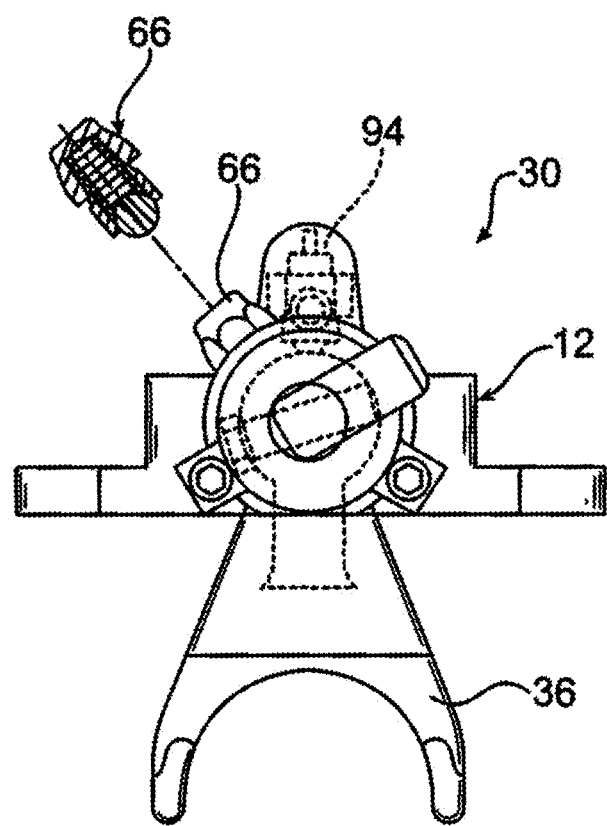
FIG. 5 is an end view of the hydraulic shifter shown in FIG. 2 shown with one of the detent mechanisms in a partial exploded view.

Referring to FIG. 1, a prior art split shaft 110 is shown mounted on a portion of a vehicle 112 and attached to an output shaft of the transmission 114. A power take off 116 is shown extending from the split shaft housing 118. Some prior art split shafts are generally straight housings to which one or more power take offs can be attached. Referring to FIG. 2, a split shaft 20 is shown with a hydraulic shifter assembly 30 of the present invention attached. The split shaft 20 is shown without central shafts and gears to better show the mounting aperture 22 for a power take off (not shown). The split shaft 20 includes a housing 24 to which a shifter housing 12 is attached. The shifter housing 12 comprises a central portion 14 and a first end portion 16 and a second end portion 18. The hydraulic shifter assembly 30 further comprises a shift shaft 34 moveable within the shifter housing 12 and having a shifter member 36 attached thereto and extending into the split shaft housing 22. The shift shaft 34 has a first piston 40 on a first end 31 of the shaft 34 separating the shaft 34 from a first pressure chamber 50 in the first end portion 16 of the shifter housing 12. The shift shaft 34 has a second piston 42 on a second end 33 of the shaft 34 separating the shaft 34 from a second pressure chamber 52 in the second end portion 18 of the shifter housing 12. Referring to FIGS. 2, 3 and 5, the hydraulic shifter assembly 30 includes a ball détente safety system 60. The ball détente safety system 60 comprises a plurality of slots 62, 64 in the shift shaft 34 and a plurality of nut retained, spring loaded balls 66. The détente system 60 is configured to hold the shift shaft 34 in either a first position (FIG. 2) toward the second end 18 of the shifter housing 12 or a second position (FIG. 4) toward the first end 16 of the shifter housing 12.

Figure 6:
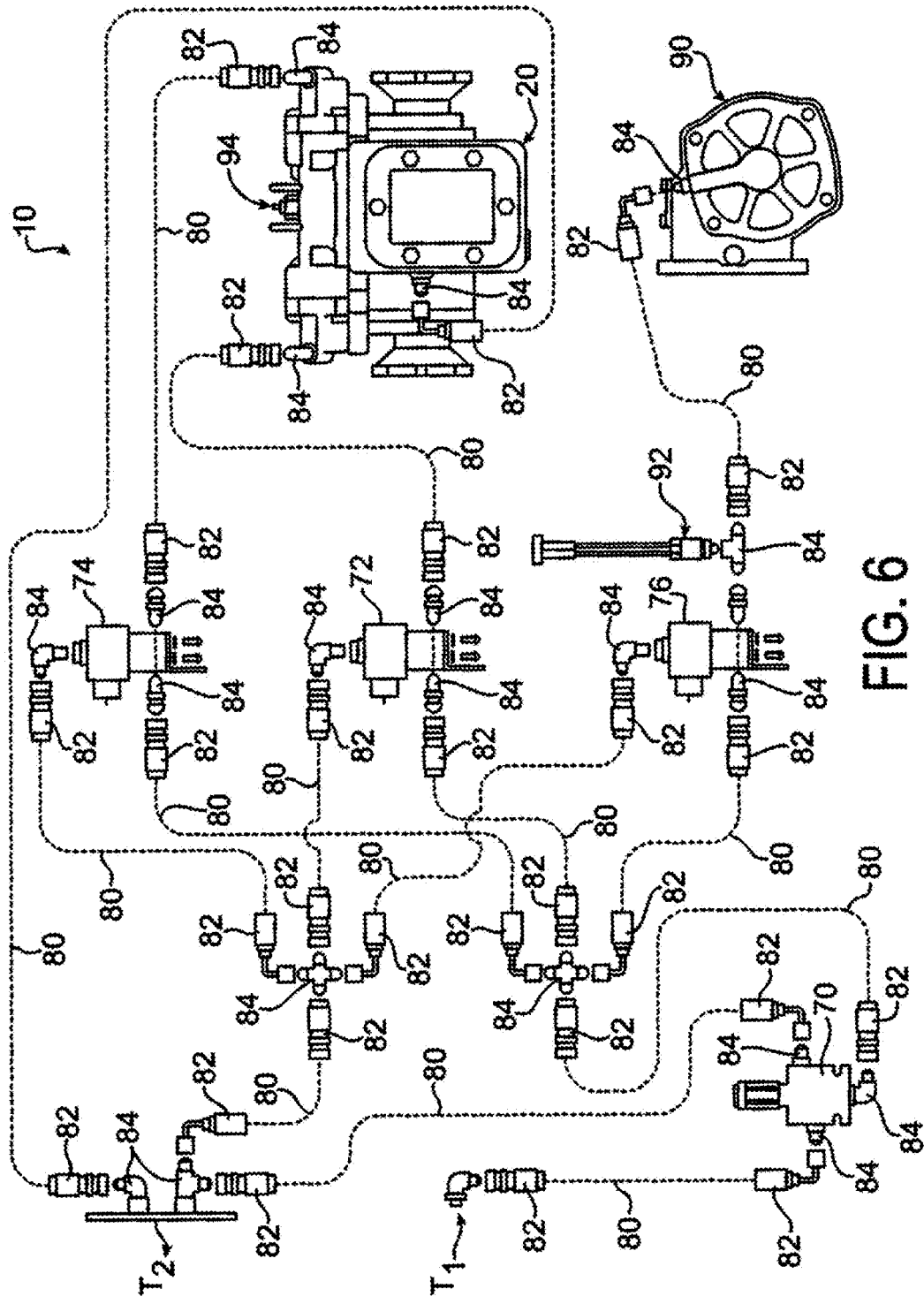
FIG. 6 is a schematic view of an embodiment of the system of the present invention.

Referring to FIG. 6, a schematic view of a hydraulic fluid system 10 is shown for a vehicle having an automatic transmission and a split shaft 20 connected to an output shaft of the transmission and a power take off 30 attached to the split shaft 20. The hydraulic fluid system 10 comprises a plurality of hydraulic fluid conduits 80, connectors 82, and nipples 84. The system 10 comprises a pressure reducing valve 70 fluidly connected to a source of pressurized hydraulic fluid of the transmission T1. The pressure reducing valve 70 limits the hydraulic pressure in the system 10 to sufficient pressure to engage the shifting mechanisms of the hydraulic shift assembly 30 and the power take off 90 and the reduced pressure also ensures that the piston seals 44 of the hydraulic shift assembly and the power take off (not shown) are not adversely affected. The system 10 further comprises a first valve 72 fluidly connecting the fluid from the pressure reducing valve 70 to either the first pressure chamber 50 of the hydraulic shifter assembly 30 or a vent return to the transmission T2, and a second valve 74 fluidly connecting the fluid from the pressure reducing valve 70 to either the second pressure chamber 52 of the hydraulic shifter assembly 30 or a vent return to the transmission T2. The first valve 72 and the second valve 74 control the movement of the shifter shaft 34 between its first and second positions which engage and disengage the split shaft assembly 20. The shift shaft 34 moves to a first position toward a second end 18 of the shifter housing 12 when the first valve 72 connects the fluid from the pressure reducing valve 70 to the first pressure chamber 50. The shift shaft 34 moves to a second position toward the first end 16 of the shifter housing 12 when the second valve 74 connects the fluid from the pressure reducing valve 70 to the second pressure chamber 52.

The system 10 may include a third valve 76 fluidly connecting the fluid from the pressure reducing valve 70 to either a power take off 90 attached to the split shaft assembly 20 or a vent return to the transmission T2. The pressure to the power take off 90 engages the power take off 90 in a known manner. The pistons in the power take off units 90 do not include any bleed hole and are not porous such that only a small amount of hydraulic fluid may weep past the piston seals 44 and into the split shaft 20. In the system 10, the hydraulic pressure to the power take off 90 dissipates back to the third valve 76 and then vents to the return to the transmission T2.

A pressure switch indicator 92 is shown attached downstream of the third valve 76 that shows the operator when the power take off 90 is engaged. A switch indicator 94 is shown on the hydraulic shifter assembly 30 which detects the position of the shifter member 36 to indicate the engagement status of the split shaft assembly 20 as best shown in the cross-section of FIG. 2.

The valves 72, 74, 76 are typically solenoid valves but are not limited as such and may be any suitable valve. The valves 72, 74, and/or 76 and various fluid connections could be made into a manifold assembly to simplify installation and such a configuration is contemplated in the present invention and claims.

As shown in FIG. 6, the pressure reducing valve 70 is fluidly connected to the return to the transmission 72 for when pressurized fluid is not needed. The split shaft assembly 20 may also be fluidly connected to the return to the transmission T2 to return any hydraulic fluid that may have wept past the piston seals 44.

The return to the transmission T2 in one embodiment is a custom plate that fits an unused power take off opening of the transmission. The return to transmission 12 includes ports 84 for the drain line from the split shaft assembly 20 and ports 84 for the vent lines from the valves 72, 74, 76.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A hydraulic system for engaging and disengaging a power take off and a transmission, the system comprising:
   an automatic transmission;
   a split shaft assembly having an input rotationally coupled to an output shaft of the transmission;
   a power take off attached to the split shaft assembly;
   a hydraulic shifter assembly attached to the split shaft assembly, the hydraulic shifter assembly comprising a shifter housing and a shift shaft moveably positioned in the shifter housing, the shift shaft having a piston on either end of the shift shaft separating the shift shaft from a pressure chamber at either end of the shifter housing;
   a plurality of fluid connectors and fluid valves that selectively, fluidly connect pressurized hydraulic fluid from the transmission to the hydraulic shifter assembly, to the power take off, and to a return to the transmission, wherein the plurality of fluid connectors and valves includes: a pressure reducing valve fluidly connected to a source of pressurized hydraulic fluid of the transmission, a first valve fluidly connecting the fluid from the pressure reducing valve to either a first pressure chamber of the shifter housing or the return to the transmission, and a second valve fluidly connecting the fluid from the pressure reducing valve to either a second pressure chamber of the shifter housing or the return to the transmission.

2. The system of claim 1, wherein the shift shaft moves to a first position toward a second end of the shifter housing when the first valve connects the fluid from the pressure reducing valve to the first pressure chamber; and
   wherein the shift shaft moves to a second position toward a first end of the shifter housing when the second valve connects the fluid from the pressure reducing valve to the second pressure chamber.

3. The system of claim 1, wherein the pressure reducing valve is fluidly connected to the return to the transmission.

4. The system of claim 1, wherein the plurality of fluid connectors and valves includes a third valve fluidly connecting the fluid from the pressure reducing valve to either the power take off or to the return to the transmission.

5. The system of claim 4, wherein the split shaft is fluidly connected to the return to the transmission.

6. The system of claim 1, wherein the hydraulic shifter includes a ball détente safety system.

7. The system of claim 6, wherein the ball détente safety system comprises a plurality of slots in the shift shaft and a plurality of spring loaded balls.

8. The system of claim 7, wherein the détente system is configured to hold the shift shaft in either a first position toward the second end of the shifter housing or a second position toward the first end of the shifter housing.

9. A hydraulic fluid system for a vehicle having an automatic transmission and a split shaft connected to an output shaft of the transmission and a power take off attached to the split shaft, the hydraulic fluid system comprising:
 a pressure reducing valve fluidly connected to a source of pressurized hydraulic fluid of the transmission;
 a first valve fluidly connecting the fluid from the pressure reducing valve to either a first pressure chamber of a hydraulic shifter or a return to the transmission;
 a second valve fluidly connecting the fluid from the pressure reducing valve to either a second pressure chamber of the hydraulic shifter or the return to the transmission; and
 a third valve fluidly connecting the fluid from the pressure reducing valve to either the power take off or to the return to the transmission.

10. The system of claim 9, wherein the pressure reducing valve is fluidly connected to the return to the transmission.

11. The system of claim 9, wherein the split shaft is fluidly connected to the return to the transmission.

12. The system of claim 9, wherein the return to the transmission is through a power take off access hole of the transmission housing.

13. A power take off system for a vehicle having an automatic transmission; the power take off system comprising:
 a split shaft assembly connected to an output shaft of the transmission;
 a power take off attached to the split shaft assembly;
 a hydraulic shifter assembly comprising a shifter housing attached to the split shaft assembly, the hydraulic shifter assembly including a shift shaft moveably positioned in the shifter housing, the shaft having a first piston in a first end of the shaft separating the shaft from a first pressure chamber in a first end of the shifter housing, the shaft having a second piston on a second end of the shift shaft separating the shift shaft from a second pressure chamber in a second end of the shifter housing;
 a pressure reducing valve fluidly connected to a source of hydraulic fluid of the transmission;
 a first valve fluidly connecting the fluid from the pressure reducing valve to either the first pressure chamber of the hydraulic shifter assembly or a return to the transmission; and
 a second valve fluidly connecting the fluid from the pressure reducing valve to either the second pressure chamber of the hydraulic shifter assembly or the return to the transmission;
 wherein the shift shaft moves to a first position toward the second end of the shifter housing when the first valve connects the fluid from the pressure reducing valve to the first pressure chamber; and
 wherein the shift shaft moves to a second position toward the first end of the shifter housing when the second valve connects the fluid from the pressure reducing valve to the second pressure chamber.

14. The system of claim 13, wherein the hydraulic shifter assembly includes a ball détente safety system.

15. The system of claim 14, wherein the ball détente safety system comprises a plurality of slots in the shift shaft and a plurality of spring loaded balls.

16. The system of claim 15, wherein the détente system is configured to hold the shift shaft in either the first or second position.

17. The system of claim 13 further comprising:
 a third valve fluidly connecting the fluid from the pressure reducing valve to either the power take off or to a return to the transmission.

18. The system of claim 13, wherein the pressure reducing valve is fluidly connected to the return to the transmission.

19. The system of claim 13, wherein the split shaft assembly is fluidly connected to the return to the transmission.

* * * * *